(12) United States Patent
Wengierow et al.

(10) Patent No.: US 11,231,683 B2
(45) Date of Patent: Jan. 25, 2022

(54) PIXEL MAPPING ONTO A DISPLAY DEVICE FOR HOLOGRAPHIC PROJECTION

(71) Applicant: Dualitas Ltd, Knowlhill (GB)

(72) Inventors: Michal Wengierow, Knowlhill (GB); Jamieson Christmas, Knowlhill (GB)

(73) Assignee: DUALITAS LTD, Knowlhill (GB)

( * ) Notice: Subject to any disclaimer, the term of this patent is extended or adjusted under 35 U.S.C. 154(b) by 165 days.

(21) Appl. No.: 16/679,167

(22) Filed: Nov. 9, 2019

(65) Prior Publication Data
US 2020/0150589 A1    May 14, 2020

(30) Foreign Application Priority Data

Nov. 9, 2018    (GB) ...................... 1818295

(51) Int. Cl.
*G03H 1/08*    (2006.01)
*G03H 1/22*    (2006.01)
(Continued)

(52) U.S. Cl.
CPC ......... *G03H 1/2294* (2013.01); *G03H 1/0005* (2013.01); *G03H 1/0841* (2013.01);
(Continued)

(58) Field of Classification Search
CPC .. G03H 1/2294; G03H 1/0005; G03H 1/0841; G03H 1/12; G03H 2001/0066;
(Continued)

(56) References Cited

U.S. PATENT DOCUMENTS 10,571,862 B1 *  2/2020  Alon-Braitbart ........ G03H 1/08
2013/0265622 A1  10/2013  Christmas et al.
(Continued)

FOREIGN PATENT DOCUMENTS

GB    2496108 A    5/2013
GB    2526275 A    11/2015
(Continued)

OTHER PUBLICATIONS

Copending U.S. Appl. No. 16/603,531, filed Oct. 7, 2019.
(Continued)

*Primary Examiner* — Arnel C Lavarias
(74) *Attorney, Agent, or Firm* — McDonnell Boehnen Hulbert & Berghoff

(57) ABSTRACT

There is provided a driver for a spatial light modulator. The spatial light modulator comprises [m×n] pixels. The driver is arranged to receive input holograms each comprising [x×y] pixels, wherein m≥x and n≥y. The driver is further arranged to drive the spatial light modulator to display thereon output holograms each comprising [m×n] pixels by tiling each input hologram onto the pixels of the spatial light modulator to form an output hologram corresponding to each input hologram using a tiling scheme. The driver is arranged to use a first tiling scheme to display a first output hologram and a second tiling scheme to display a second output hologram. Each output hologram comprises a plurality of tiles of the input hologram. Each tiling scheme defines the size of each tile and the position of each tile on the pixels of the spatial light modulator.

17 Claims, 13 Drawing Sheets

(51) Int. Cl.
*G03H 1/00* (2006.01)
*G03H 1/12* (2006.01)
*G03H 1/02* (2006.01)

(52) U.S. Cl.
CPC ....... *G03H 1/12* (2013.01); *G03H 2001/0066* (2013.01); *G03H 2001/0224* (2013.01)

(58) Field of Classification Search
CPC ............. G03H 2001/0224; G03H 1/00; G03H 2001/0088; G03H 1/0443; G03H 1/08; G03H 1/0866; G03H 2001/0883; G03H 1/0891; G03H 2001/2297; G03H 2226/00; G03H 2226/02; G03H 2226/11
USPC .......... 359/9, 1, 21, 29, 32, 35, 33; 430/1, 2
See application file for complete search history.

(56) References Cited

U.S. PATENT DOCUMENTS

| | | |
|---|---|---|
| 2014/0022526 A1 | 1/2014 | Van Eijk et al. |
| 2014/0253987 A1 | 9/2014 | Christmas |
| 2017/0082855 A1 | 3/2017 | Christmas et al. |
| 2017/0115627 A1 | 4/2017 | Christmas et al. |
| 2017/0363869 A1 | 12/2017 | Christmas et al. |
| 2018/0046138 A1 | 2/2018 | Christmas et al. |
| 2018/0120768 A1 | 5/2018 | Christmas |
| 2018/0188532 A1 | 7/2018 | Christmas et al. |
| 2018/0292787 A1 | 10/2018 | Lim |
| 2019/0041641 A1 | 2/2019 | Christmas et al. |
| 2019/0064738 A1 | 2/2019 | Cole et al. |
| 2020/0033803 A1 | 1/2020 | Christmas |
| 2021/0055691 A1* | 2/2021 | Wengierow ........ G02B 27/0172 |

FOREIGN PATENT DOCUMENTS

| | | |
|---|---|---|
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| GB | 2560490 A | 9/2019 |
| WO | 2014053164 A1 | 4/2014 |
| WO | 2018078366 A1 | 5/2018 |
| WO | 2018100394 A1 | 6/2018 |
| WO | 2018100397 A1 | 6/2018 |

OTHER PUBLICATIONS

Y. Takaki et al., "Speckle-free and grayscale hologram reconstruction using time-multiplexing technique," Optics Express, 19(8), 7567-79 (2011).
F. Wyrowski et al., "Speckle-free reconstruction in digital holography," J. Optical Society of America A, 6(8), 1171-1174 (1989).
L. Golan et al., "Speckle elimination using shift-averaging in high-rate holographic projection," Optics Express, 17(3), 1330-39 (2009).
Search Report under Section 17, United Kingdom Patent Application GB1818295.6, dated May 3, 2019.
Copending U.S. Appl. No. 16/665,174, filed Oct. 28, 2019.
Copending U.S. Appl. No. 16/665,194, filed Oct. 28, 2019.

* cited by examiner

PIXEL MAPPING ONTO A DISPLAY DEVICE FOR HOLOGRAPHIC PROJECTION

CROSS-REFERENCE TO RELATED APPLICATIONS

This application claims the benefit of priority of United Kingdom Patent Application no. 1818295.6, filed Nov. 9, 2018, which is hereby incorporated herein by reference in its entirety.

FIELD

The present disclosure relates to a driver for a spatial light modulator, a tiling engine for a spatial light modulator and a method of driving a spatial light modulator. More specifically, the present disclosure relates to a holographic projector and a method of holographic projection. Some embodiments relate to a method of improving the quality of a holographic projection and a method of increasing the resolution of a holographic projection. Other embodiments relate to a hologram processor for mapping pixels of an input hologram onto a display pixel and a method of mapping hologram pixels onto a display device comprising pixels. Further embodiments relate to a head-up display comprising the holographic projector.

BACKGROUND AND INTRODUCTION

Light scattered from an object contains both amplitude and phase information. This amplitude and phase information can be captured on a photosensitive plate or film using an interference technique called holography. The pattern captured on the photosensitive plate or film is referred to as a holographic recording or hologram. The hologram may be used to form a reconstruction of the object. The reconstruction of the object formed by the hologram is referred to as a holographic reconstruction. The holographic reconstruction may be formed by illuminating the hologram with suitable light.

Computer-generated holography may numerically simulate the processes used to form a hologram by interference of light. A computer-generated hologram may be calculated using a mathematical transformation. The mathematical transform may be based on a Fourier transform. The mathematical transform may be a Fourier transform or Fresnel transform. A hologram calculated by performing a Fourier transform of a target image may be referred to as a Fourier transform hologram or Fourier hologram. A Fourier hologram may be considered a Fourier domain, or frequency domain, representation of the target image. A hologram calculated using a Fresnel transform may be referred to as a Fresnel hologram.

A computer-generated hologram may comprise an array of hologram values which may be referred to as hologram pixels. Each hologram value may be a phase and/or amplitude value. Each hologram value may be constrained—e.g. quantised—to one of a plurality of allowable values. A computer-generated hologram may be displayed on a display device. The choice of allowable values may be based on the display device which will be used to display the hologram. The plurality of allowable values may be based on the capabilities of the display device.

The display device may be a spatial light modulator comprising an array of pixels. The spatial light modulator may be a liquid crystal device in which case each pixel is an individually-addressable liquid crystal cell having birefringence. Each pixel may modulate the amplitude and/or phase of light in accordance with a corresponding hologram pixel. Each pixel comprises a light-modulating element and a pixel circuit arranged to drive the light-modulating element. The hologram may be considered a light modulation pattern.

A holographic reconstruction may be formed by illuminating the displayed hologram with suitable light. The amplitude and/or phase of incident light is spatially modulated in accordance with the light modulation pattern. The light is diffracted by the spatial light modulator. The complex light pattern emanating from the display device interferes at a replay plane to form a holographic reconstruction corresponding to the target image. If the hologram is a Fourier hologram, the replay plane is in the far-field (i.e. an infinite distance from the display device) but a lens may be used to bring the replay plane into the near-field. For convenience, the holographic reconstruction itself may be referred to as an image. The holographic reconstruction is projected onto a plane away from the display device and the technique is therefore known as holographic projection. A head-up display may be formed using a holographic projector but many other devices, such as a head-mounted display, may use a holographic projector in accordance with the present disclosure as the image source.

The present disclosure relates to a technique for improving the quality of a holographic projection.

SUMMARY

The driver in accordance with the present disclosure may be used as part of a system to display an image (i.e. holographic reconstruction) which is static or changeable in time such as changeable in real-time. The holograms in accordance with the present disclosure comprise a plurality of pixels—for example, [x×y] pixels. If the hologram has fewer pixels than the display device, the hologram may be tiled onto the display device. Tiling uses the extra pixels of the display device to display repeats of at least part of the hologram. Tiling results in the display of a tiled pattern on the display device, wherein the tiled pattern comprises a plurality of tiles. A tile is continuous, contiguous group of pixels of the hologram. The plurality of tiles may comprise any number of full-tiles and any number of part-tiles of the hologram. A full-tile is the complete hologram. That is, a full-tile is the complete, contiguous group of [x×y] pixels of the hologram. A part-tile is a subset of the hologram. That is, a part-tile is a continuous, contiguous subset of the [x×y] pixels of hologram. In some embodiments, tiling is used to fill the display device. That is, tiling may use all pixels of the display device to display the hologram. In some embodiments, all tiles are quadrangular. In some embodiments, all tiles are rectangular. Each tile may have any size or aspect ratio, as required.

The hologram which is repeated on the display device is referred to herein as the input hologram because it is the source used for the tiling process. The resultant pattern having tiles which is displayed on the display device is referred to herein as the output hologram. The input hologram is an input computer-generated hologram and the output hologram is an output computer-generated hologram. The output hologram displayed on the display device may also be referred to as a light modulation pattern. In summary, the present disclosure relates to a driver for a spatial light modulator which forms output holograms from input holograms using a dynamically-changed tiling scheme.

Each tiling scheme in accordance with the present disclosure results from a unique pixel mapping scheme which maps groups of contiguous pixels of the input hologram onto the pixels of the output hologram such that all pixels of the output hologram correspond to one pixel of the input hologram. It will therefore be understood that some pixels of the input hologram correspond to multiple pixels of the output hologram. It may be said that there is a one-to-many correlation between at least some pixels of the input hologram and the pixels of the output hologram. The number of tiles may be two to twelve, such as four to ten. Each tile comprises at least two pixels. Each tiling scheme may be selected from a plurality of tiling schemes such as two to twelve tiling schemes. In some embodiments, each tiling scheme is selected from a group comprising four or eight different tiling schemes. In some embodiments, each tiling scheme forms an output hologram comprises at least one full-tile. In some embodiments, a first tiling scheme forms an output hologram comprises four full-tiles and a second, third and fourth tiling scheme comprise one full-tile and eight part-tiles. However, the present disclosure extends to forming output holograms comprising any combination of full-tiles and part-tiles that can fit on the display device.

There is provided a driver for a spatial light modulator. The spatial light modulator comprises [m×n] pixels. The driver is arranged to receive input holograms each comprising [x×y] pixels. In some examples disclosed herein, m≥x and n≥y. In other examples disclosed herein, m>x and/or n>y. The driver is further arranged to drive the spatial light modulator to display thereon output holograms each comprising [m×n] pixels by tiling each input hologram onto the pixels of the spatial light modulator to form an output hologram corresponding to each input hologram using a tiling scheme. The driver is arranged to use a first tiling scheme to display a first output hologram and a second tiling scheme to display a second output hologram. Each output hologram comprises a plurality of tiles of the input hologram. Each tiling scheme defines the size of each tile and the position of each tile on the pixels of the spatial light modulator.

Each output hologram formed by tiling is a continuous light modulation pattern comprises a plurality of tiles of the input hologram, wherein a tile is a continuous, contiguous group of pixels of the input hologram. The tiling scheme is a pixel mapping scheme comprises one-to-many mapping between at least some pixels of the hologram and the pixels of the spatial light modulator.

Likewise, there is provided a method of driving the spatial light modulator comprising [m×n] pixels. The method comprises a first step of receiving input holograms comprising [x×y] pixels, wherein m≥x and n≥y. The method comprises a second step of displaying a first output hologram comprising [m×n] pixels by tiling an input hologram onto the pixels of the spatial light modulator, at a first time, using a first tiling scheme. The method comprises a third step of displaying a second output hologram comprising [m×n] pixels by tiling an input hologram onto the pixels of the spatial light modulator, at a second time, using a second tiling scheme. The first step may be performed before the second step and the second step may be performed before the third step.

The total number of pixels in each input hologram is less than the number of pixels in the corresponding output hologram or holograms represented on the spatial light modulator. For example, the input hologram can be smaller than the output hologram in both dimensions (m>x and n>y) or smaller than the output hologram in only one dimension (m>x, n=y or m=x, n>y). This arrangement enables mapping of every part of the input hologram to a location somewhere in the output hologram. In embodiments, the whole input hologram is mapped as a continuous set of pixels. In other examples, the input hologram is broken up into multiple sets of pixels in the mapping such that the output hologram does not comprise a continuous representation of the entire input hologram. That is, in these other examples, the output hologram does not comprise a full-tile. In embodiments, each output hologram comprises at least one full tile and, optionally, a plurality of part-tiles. Pixels of a received, input, hologram are mapped onto at least one corresponding, larger, output hologram using a dynamic/changeable tiling scheme. At least one pixel of the original input hologram is repeated in the output hologram. For example, the pixel array of the spatial light modulator can be divided up into a number of discrete areas, each of which is arranged to represent at least a subset of the input hologram. Part of the input hologram (that is, a continuous subset of the pixels of the hologram) can therefore be repeated on those spatial light modulator pixels which would otherwise have been unused.

The driver for the spatial light modulator in accordance with the present disclosure improves the image quality of the holographic reconstruction. Specifically, it is found to smooth or average out optical effects which manifest themselves as noise or artefacts in the holographic reconstruction.

In some embodiments, each tile of the output hologram comprises at least one end or boundary of the input hologram. More specifically, each tile comprises at least one end row of pixels or end column of pixels of the hologram. An end row/column of the input hologram is one of the four boundary rows and columns of pixels of the input hologram. More specifically, an end row/column is the first or the last row/column of pixels of the input hologram. The first row/column of pixels is opposite the last row/column of pixels. For example, row 1 is opposite row x and column 1 is opposite column y. In some embodiments, the tiling is continuous which means that all pairs of adjacent tiles of the output hologram connect one end of the input hologram to the opposite end of the input hologram. For example, adjacent tiles may connect column y to column 1 or row x to row 1. It may be said that all adjacent tiles either connect the last column of pixels of the input hologram to the first column of pixels of the input hologram or the last row of pixels of the input hologram to the first row of pixels of the input hologram.

Notably, the inventors have found that if adjacent tiles introduce a mid-sequence discontinuity in the repeating sequence of pixel values of the input hologram, artefacts are observed in the holographic reconstruction which are detrimental to the perceived quality of the image. These artefacts are minimised when each row and each column of the output hologram does not break the sequence of pixel values of the input hologram. That is, each row and column of the output hologram is a continuous repeat of the corresponding row or column of the input hologram. The tiles of a tiled pattern that is continuous connect the repeating pattern end to end. The output hologram does not comprise any rows or columns which include a jump in the sequence of pixel values or omit pixel values in the sequence. It may be said that these embodiments form continuous repeats of the hologram pattern.

Further notably, the inventors have also found that the disclosed technique for improving the quality of the holographic reconstruction is particularly effective when the output hologram comprises at least one full-tile and each pixel of the input hologram is repeated at least once in the output hologram in both directions of the array of pixel values. The latter may be achieved when the output hologram is a continuous repeat of the hologram pattern, as defined above, and m≥2x and n≥2y. For the avoidance of any doubt, in some embodiments, each output hologram comprises at least one full-tile, wherein a full-tile is the complete, contiguous group of [x×y] pixels of the input hologram. In some embodiments, each output hologram additionally or alternatively comprises a plurality of part-tiles, wherein a part-tile is a contiguous subset of pixels of the input hologram.

The driver may be arranged to receive a first input hologram. The driver may be arranged to tile the first input hologram onto the pixels of the spatial light modulator, at a first time, using a first tiling scheme to display a first output hologram. The driver may also be arranged to tile the first input hologram onto the pixels of the spatial light modulator, at a second time, using a second tiling scheme to display a second output hologram.

Likewise, the method of driving a spatial light modulator may further comprise a fourth step of tiling the first input hologram onto the pixels of the spatial light modulator, at the first time, using a first tiling scheme to display a first output hologram. The method may further comprise a fifth step of tiling the first input hologram onto the pixels of the spatial light modulator, at the second time, using a second tiling scheme to display a second output hologram.

This arrangement facilitates the calculation, or formation, of multiple output holograms, each of which corresponds to a single received, input, hologram. The received input hologram may be one hologram of a sequence of holograms and a plurality of output holograms may be generated for each input hologram. For example, a plurality of output holograms corresponding to the same input hologram may be displayed before the next input hologram is processed. The image content of each output hologram is, of course, the same but, in this embodiment, different tiling schemes may be used to form the output holograms. The number of output holograms per input hologram may be determined, for example, by the speed of the hardware, refresh rate of the display device or frame rate of incoming images or computer-generated holograms corresponding to the images. In examples, each input hologram is used to form 3 or 6 differently-tiled output holograms. Different tiling schemes can be used with a single input hologram, which enables multiple holographic reconstructions of the same image. For the avoidance of doubt, one tiling scheme is used to form an output hologram from an input hologram and an output hologram gives rise to a holographic reconstruction when suitably illuminated. The use of different tiling schemes with the same input hologram to display a sequence of corresponding output holograms is found to improve image quality. Optionally, the tiling scheme may be changed 2 to 6 times per input hologram, though the tiling scheme could be changed 2 to 12 times per input hologram. That is, 2 to 6 or even 2 to 12 different output holograms could be displayed in succession for each input hologram, wherein each output hologram is a differently tiled version of the same input hologram. Any other rate of change of the tiling scheme is possible. For example, the rate of change of tiling schemes can be equal to or greater than, for example, 120 Hertz (Hz), 180 Hz, 240 Hz, 300 Hz, 360, 420 Hz, or 480 Hertz (Hz), to achieve this effect. The tiling scheme may be changed every other output hologram, for example, or in accordance with any conceivable scheme.

The driver may be arranged to receive a sequence of input holograms such as a video-rate sequence of input holograms. The driver may be arranged to, for each input hologram, display a plurality of corresponding output holograms in succession, before the next input hologram is received, by tiling the input hologram onto the pixels of the spatial light modulator using a plurality of different tiling schemes. Likewise, the method of driving a spatial light modulator may further comprise receiving a video-rate sequence of input holograms and, for each input hologram, displaying a plurality of corresponding output holograms in succession, before the next input hologram is received, by tiling the input hologram onto the pixels of the spatial light modulator using a plurality of different tiling schemes.

The driver may be arranged to receive a first input hologram and tile the first input hologram onto the pixels of the spatial light modulator, at a first time, using a first tiling scheme to display a first output hologram. The driver may be further arranged to receive a second input hologram and tile the second input hologram onto the pixels of the spatial light modulator, at a second time, using a second tiling scheme to display a second output hologram.

Likewise, the method of driving the spatial light modulator may comprise receiving a first input hologram. The method may comprise tiling the first input hologram onto the pixels of the spatial light modulator, at a first time, using a first tiling scheme to display a first output hologram. The method may comprise receiving a second input hologram. The method may comprise tiling the second input hologram onto the pixels of the spatial light modulator, at a second time, using a second tiling scheme to display a second output hologram.

In embodiments, each output hologram corresponds to a different input hologram which can be, for example, one frame in a sequence of frames. As such, the tiling scheme is changed with each new input hologram, rather than multiple times per input hologram. In these embodiments, the tiling scheme may be changed every input hologram or every other input hologram, for example. For example, the tiling scheme may be changed at 60 Hz, 30 Hz or 15 Hz. In other embodiments, the tiling scheme is continuous changed and no two successive output holograms use the same tiling scheme. It may be said that, in embodiments, the tiling scheme is changed with each display event.

The driver may be arranged to receive a video-rate sequence of input holograms. The driver may be further arranged to display a corresponding video-rate sequence of output holograms by successively tiling each input hologram onto the pixels of the spatial light modulator and successively changing the tiling scheme.

In some embodiments, each input hologram comprises a spatial distribution of spatial frequencies. Each input hologram comprising a spatial distribution of spatial frequencies is a Fourier or Fresnel hologram.

Notably, dynamic tile-shifting effectively moves the spatial frequencies around on the display device. That is, it changes the spatial distribution of the spatial frequencies. This improves image quality because it has the effect of smoothing out imperfections in the projection system. For example, in practice, the light used to illuminate the hologram will have some non-uniformities in intensity and some variations in phase across the wave-front. If the intensity of the incident light is not perfectly uniform, different spatial frequencies will be illuminated at different intensities. Likewise, small variations in phase across the incident wave-front introduce a phase error distribution across the display device. Furthermore, the display device itself may be imperfect and there may be an error distribution associated with the array of pixels. These issues, and other similar issues, degrade image quality. The inventors have found that, in particular, these issues give rise to non-uniformities in the image spots (or image pixels) forming the image. It is found that the size, shape and intensity of the image spots is more uniform across the replay field when dynamic re-tiling of a Fourier or Fresnel hologram is used. More uniform image spots allow packing density to be increased without introducing the problem of pixel cross-talk in which adjacent image spots interfere and introduce noise into the image. A higher resolution image may therefore be provided without increasing noise.

There is also provided a holographic projector comprising the driver, a spatial light modulator and a light source. The light source is arranged to illuminate each output hologram displayed on the spatial light modulator with coherent light such that a holographic reconstruction corresponding to each input hologram is formed on a replay plane.

Likewise, there is provided a method of holographic projection comprising driving a spatial light modulator as described herein and illuminating each output hologram with coherent light to form at least one holographic reconstruction on a replay plane corresponding to each input hologram.

In some embodiments, the holographic reconstruction is formed on a light-receiving feature or light-receiving surface such as a screen and the light which is spatially-modulated by the spatial light modulator is coherent light from a source of coherent light such as a laser. In these embodiments, the holographic reconstruction will exhibit laser speckle. By using first and second tiling schemes which are different, the holographic reconstruction is improved. Changing the tiling scheme averages the perceived speckle pattern over a sequence of output computer generated holograms. In particular, a translation of a hologram on the SLM causes a phase-shift in the replay image or holographic reconstruction. The human eye cannot detect phase, so the viewer does not notice this phase-shift. However, this phase-shift changes the interference pattern caused by the screen onto which the image is projected and thus reduces the perceived effect of speckle in the replay image. In essence, dynamically reconfiguring the tiling pattern, or tiling scheme, introduces a pseudo-randomness into the holographic reconstruction which blurs speckle and thus reduces the problem of speckle in the reconstruction, or replay image.

In some embodiments, there is provided a method comprising the step of calculating a hologram comprising fewer pixels than the display device for the purpose of facilitating dynamic re-tiling. The method may comprise reducing the number of pixels of an image before calculating a hologram corresponding to the image so that the number of hologram pixels is less than the number of display device pixels. The method may comprise down-sizing or reducing the resolution (number of pixels) of an image prior to hologram calculation such that the number of hologram pixels is less than the number of pixels of the display device after down-sizing. The method may comprise using all pixels of the display device to display a light modulation pattern comprising at least one full tile and at least one part-tile of the down-sized hologram.

In some embodiments described herein, the driver is alternatively referred to as a tiling engine.

There is provided a holographic projector comprising: a tiling engine arranged to receive input computer-generated holograms comprising [x×y] pixels and form corresponding output computer-generated holograms comprising [m×n] pixels for output to a spatial light modulator, where mn>xy, by mapping pixels of each received computer-generated hologram onto pixels of at least one corresponding output computer-generated hologram in accordance with a tiling scheme; and a spatial light modulator arranged to receive and represent a sequence of output computer-generated holograms from the tiling engine and output spatially-modulated light for forming a holographic reconstruction in accordance with each computer-generated hologram represented on the spatial light modulator, wherein the tiling engine is further arranged to use a first tiling scheme to map pixels onto a first output computer-generated hologram comprising [m×n] pixels and a second tiling scheme to map pixels onto a second output computer-generated hologram comprising [m×n] pixels.

There is provided a driver or tiling engine for a holographic projector. The driver or tiling engine is arranged to receive input computer-generated holograms comprising [x×y] pixels and form corresponding output computer-generated holograms comprising [m×n] pixels, where mn>xy, by mapping pixels of each received computer-generated hologram onto pixels of at least one corresponding output computer-generated hologram in accordance with a tiling scheme. The driver or tiling engine is further arranged to use a first tiling scheme to map pixels onto a first output computer-generated hologram comprising [m×n] pixels and a second tiling scheme to map pixels onto a second output computer-generated hologram comprising [m×n] pixels.

There is provided a holographic projector comprising a tiling engine and a light source. The tiling engine is arranged to receive an input hologram comprising [x×y] pixels and display a corresponding output hologram comprising [m×n] pixels on a spatial light modulator, wherein m≥2x and n≥2y, by tiling the input hologram onto the pixels of the spatial light modulator to form thereon the output hologram. The light source is arranged to illuminate the output hologram to form spatially-modulated light forming a holographic reconstruction corresponding to the output hologram. The tiling engine is further arranged to use a first tiling scheme to display a first output computer-generated hologram comprising [m×n] pixels and a second tiling scheme to display a second output computer-generated hologram comprising [m×n] pixels.

The tiling engine may be arranged to receive a first input hologram comprising [x×y] pixels and form a first output hologram comprising [m×n] pixels and a second output hologram comprising [m×n] pixels by mapping pixels of the first input hologram onto pixels of the first output hologram in accordance with a first tiling scheme and mapping pixels of the first hologram onto pixels of the second output hologram in accordance with a second tiling scheme. Additionally, the tiling engine may be arranged to form a plurality of output holograms comprising [m×n] pixels from the first input hologram by mapping pixels of the first input hologram onto pixels of a plurality of output holograms in accordance with a corresponding plurality of different tiling schemes.

The tiling engine may be arranged to: receive a first hologram comprising [x×y] pixels and form the first output hologram comprising [m×n] pixels by mapping pixels of the first hologram onto pixels of the first output hologram in accordance with a first tiling scheme; and receive a second input hologram comprising [x×y] pixels and form a second output hologram comprising [m×n] pixels by mapping pixels of the second input hologram onto pixels of the second output hologram in accordance with the second tiling scheme. Additionally, the tiling engine may be arranged to form a plurality of output holograms comprising [m×n] pixels corresponding to each input hologram by mapping pixels of each input hologram onto pixels of a plurality of corresponding output holograms in accordance with a corresponding plurality of different tiling schemes.

In some arrangements, the holographic projector is configured to form a colour holographic reconstruction. In some examples, this is achieved by the method known as Spatially Separated Colours, or "SSC", in which a plurality of different colour (e.g. red, green and blue) holographic reconstructions are superimposed by using a respective plurality of monochromatic light sources and a respective plurality of single colour holograms. Each respective hologram may be represented on a respective spatial light modulator or a respective plurality of pixels of one common spatial light modulator. It may therefore be understood that in these examples, a plurality of light channels are used. Each light channel may use a respective plurality of different tiling schemes as described herein because the colour channels are independent. The plurality of different tiling schemes may therefore be same for each colour channel or different.

One or more different tiling schemes can be used to form the output computer-generated hologram represented on the respective spatial light modulator of each colour channel. In this way, a single frame colour holographic reconstruction can be formed using first, second and third tiling schemes which are different to one another, or one or more of them could be the same.

A colour holographic reconstruction may also be achieved using a method known as Frame Sequential Colour, or "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on. An advantage of the FSC method is that the whole SLM is used for each colour. This means that the quality of the three colour images produced will not be compromised because all pixels on the SLM are used for each of the colour images.

In some embodiments, the tiling scheme tiles the input hologram onto the display device line by line. It can be quicker to form the output computer-generated hologram in this way, as compared to forming the output computer generated hologram tile by tile or even pixel by pixel, because long sequences of data may be mapped in the order they are stored in the memory. This can reduce the computational load on the tiling engine.

The holographic projector may further comprise a hologram engine configured to provide the input hologram to the tiling engine. The processor may be configured to calculate the input hologram from a target image. This calculation may occur in real-time using the method described herein. In some embodiments, generation of the input hologram comprises first down-sizing the target image such that the number of pixels of the input hologram is less than the number of pixels of the initial target image and less than the number of pixels of the display device. Alternatively, the processor can be configured to retrieve the input hologram from a repository of previously generated holograms, for example, previously generated holograms stored on a computer readable medium or other storage device.

In some examples, the spatial light modulator applies phase-only modulation to the light received. The spatial light modulator may thus be a phase-only spatial light modulator. This may be advantageous because no optical energy is lost by modulating amplitude. Accordingly, an efficient holographic projection system is provided. However, the present disclosure may equally be implemented on an amplitude-only spatial light modulator or an amplitude and phase (complex) spatial light modulator. It may be understood that the hologram will be correspondingly phase-only, amplitude-only or fully-complex.

The term "hologram" is used to refer to the recording which contains amplitude and/or phase information about the object. In this disclosure, the input, or received, hologram is a hologram. The entirety of the output, computer-generated, hologram is also a hologram—the term "hologram" encompasses the combination of a full-tile of the input hologram and additional part-tiles. The term "holographic reconstruction" is used to refer to the optical reconstruction of the object which is formed by illuminating the hologram. The term "replay plane" is used to refer to the plane in space where the holographic reconstruction is formed. The terms "image", "image region" and "replay field" refer to areas of the replay plane illuminated by light forming the holographic reconstruction. In some embodiments, the "image" comprises image spots which may be referred to as "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" or "represent" a light modulation distribution or pattern in response to receiving the plurality of control values.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "light" is used herein in its broadest sense. Some embodiments are equally applicable to visible light, infrared light and ultraviolet light, and any combination thereof.

The present disclosure refers to or describes 1D and 2D holographic reconstructions by way of example only. The holographic reconstruction may alternatively be a 3D holographic reconstruction. That is, in some examples of the present disclosure, each computer-generated hologram forms a 3D holographic reconstruction.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in a co-dependent relationship.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Optical Configuration

Figure 1:
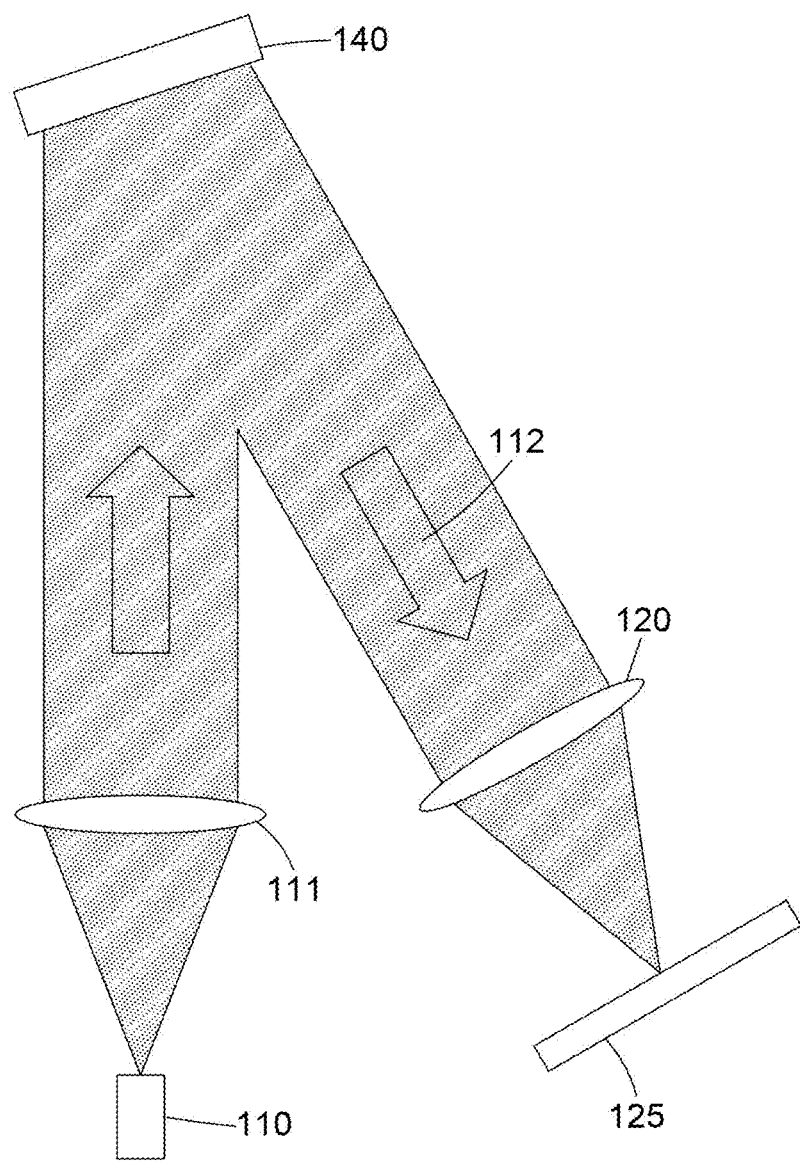
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram. In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
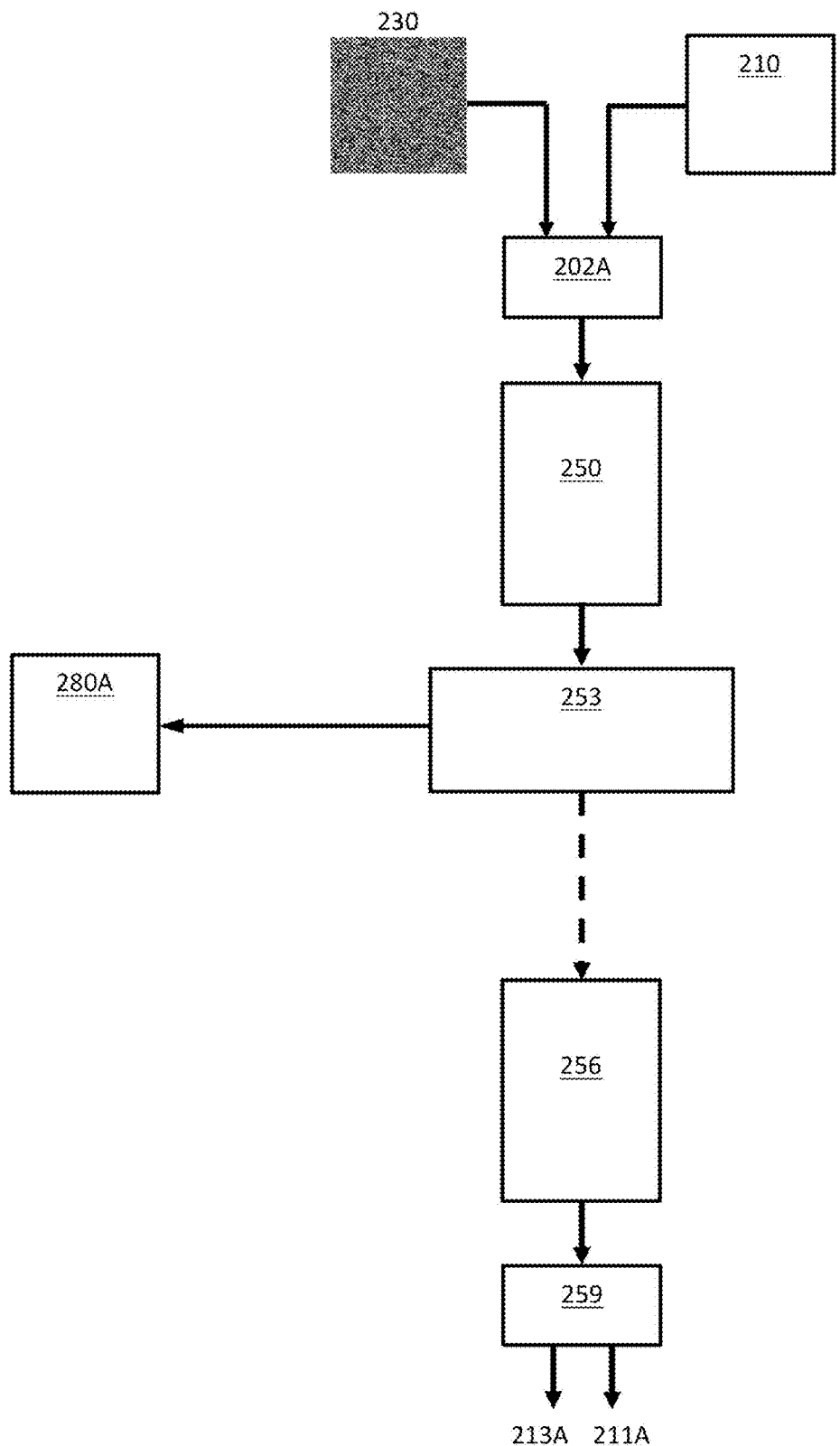
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 210 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
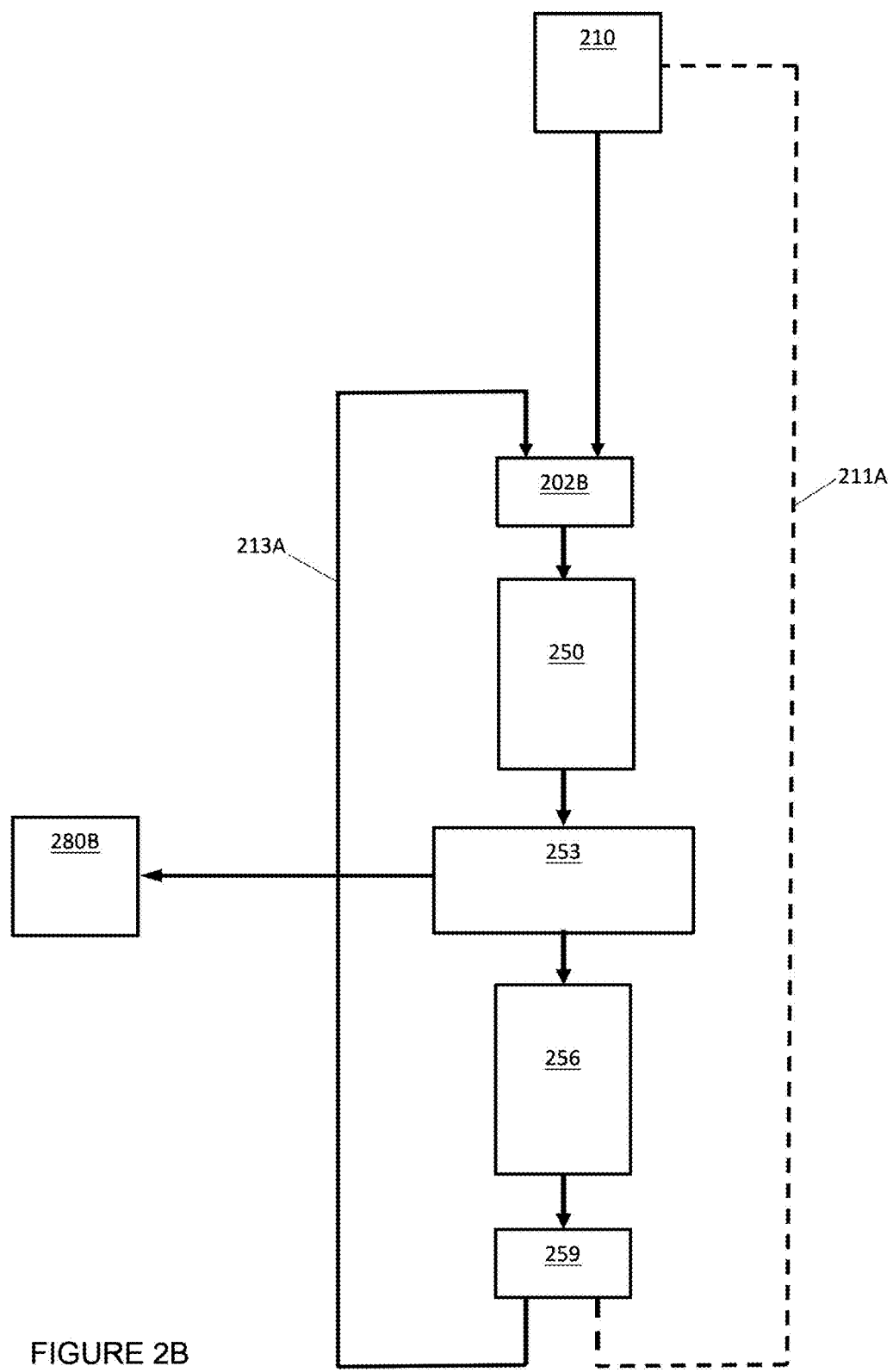
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
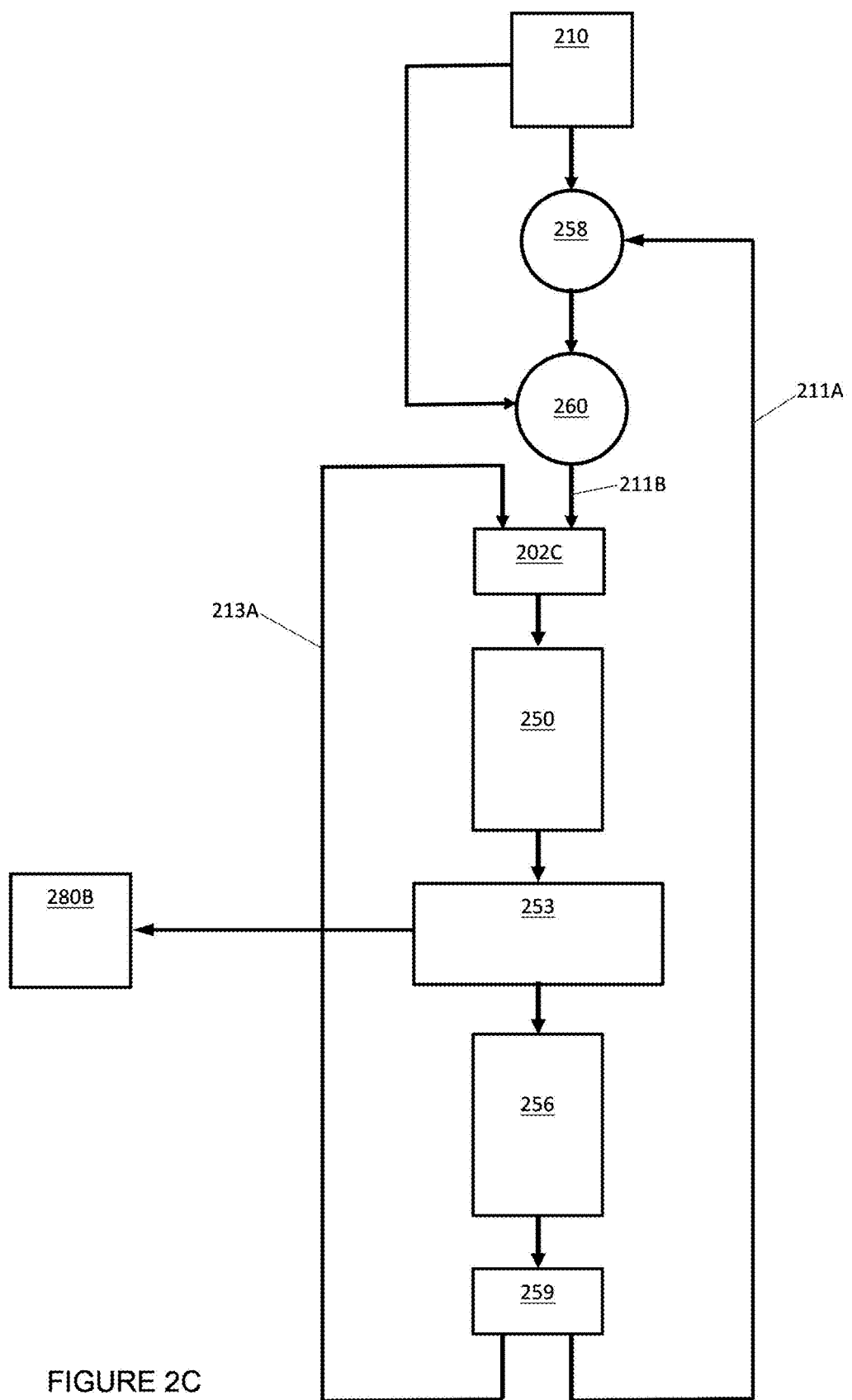
FIG. 2C illustrates alternative second and subsequent iterations of the example.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the light modulation (or diffractive) pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of pixels within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
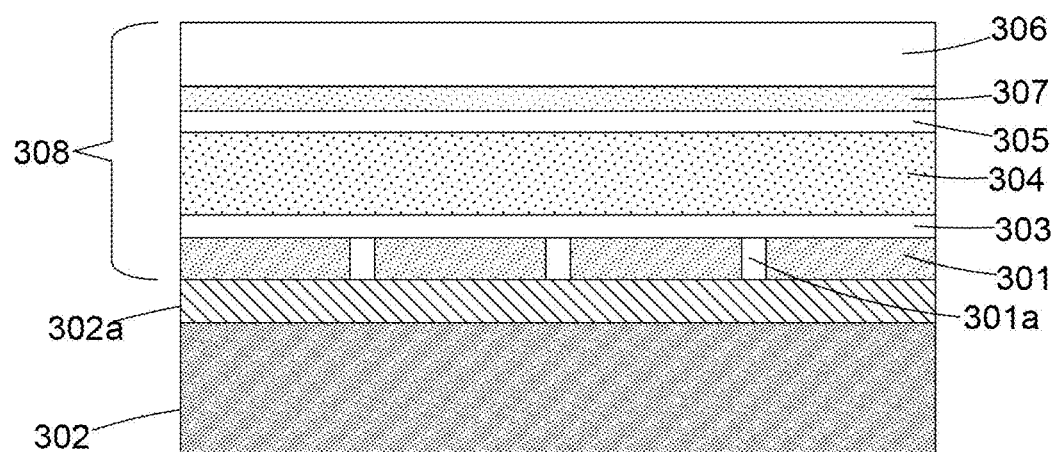
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM. In embodiments, the received computer-generated hologram is an input hologram to a tiling engine. The input hologram is "tiled" on the spatial light modulator in accordance with a tiling scheme and the tiling scheme is dynamically changed, for example, it is changed between input holograms. The concepts of a "tile" and "tiling" are further explained with reference to FIG. 4.

Hologram Tiling

Figure 4A:
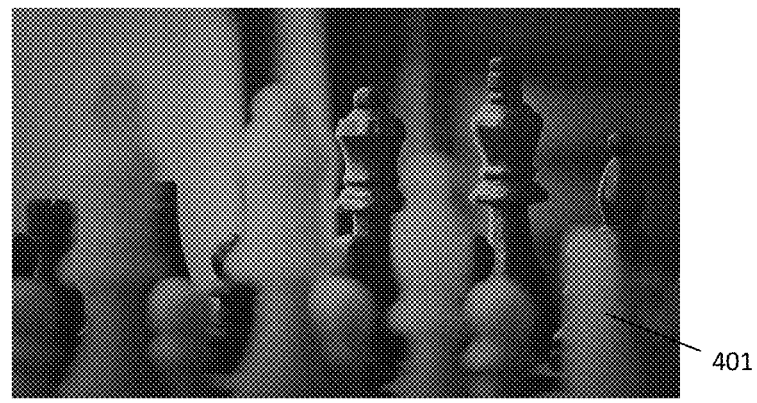
FIG. 4A shows an example of an input image.
Figure 4B:
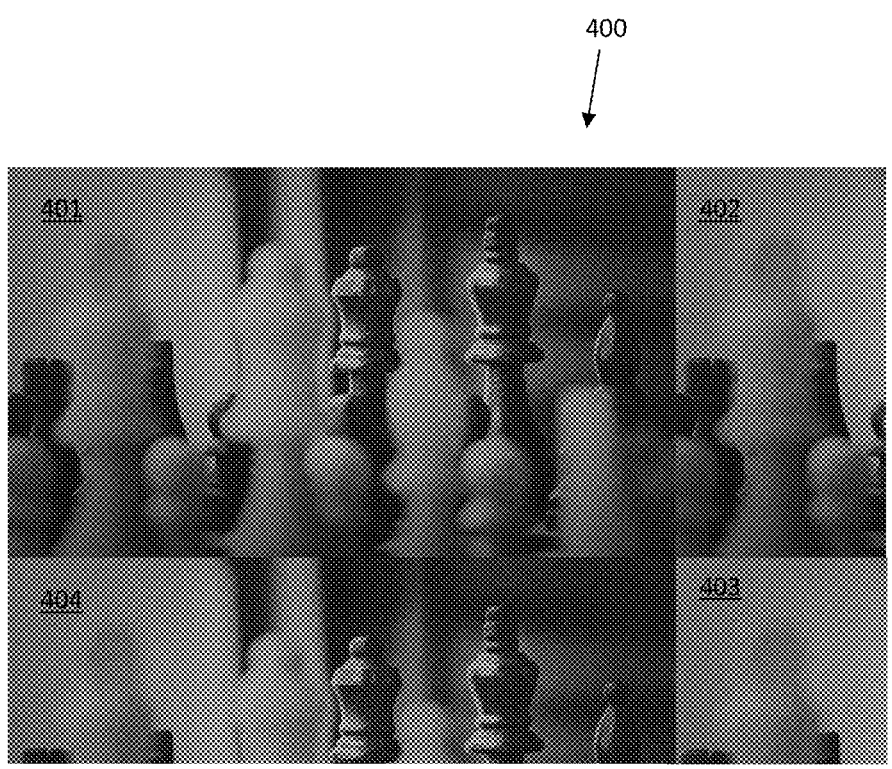
FIG. 4B shows an example of the pixels of the input image of FIG. 4A, where the pixels are arranged as complete and part-tiles.

FIG. 4A illustrates an input image 401 for the purpose of explaining tiling only. For the purpose of this explanation only, input image 401 is a conventional image familiar to the reader, not a hologram. The image 401 consists of [x×y] pixels. FIG. 4B illustrates the concept of tiling with respect to the input image 401 in FIG. 4A. In FIG. 4B, a second, larger, image 400 consisting of [m×n] pixels (where m>x and n>y) is formed by repeating subsets of pixels of the original input image 401.

In particular, the second image 400 comprises a set 401 of [x×y] pixels identical to those pixels of the original input image 401. This set 401 of [x×y] pixels in the second image can be considered as a full-tile (also referred to herein as a "complete tile"). The second image 400 also comprises a first subset 402 of [a×b] pixels of the input image 401. This first subset 402 of [a×b] pixels (where a≤x and b<y or a<x and b≤y) can be considered to be a first part-tile. The second image also comprises a second subset 403 of [a,' b'] pixels of the input image 401. This second subset 403 of [a'×b'] pixels (where a'≤x and b'<y or a'<x and b' y) can be considered to be a second part-tile. The second image 400 also comprises a third subset 404 of [a"×b"] pixels of the input image 401. This third subset 404 of [a"×b"] pixels (where a"≤x and b"<y or a"<x and b"≤y) can be considered to be a third part-tile.

For the purpose of this explanation, the arrangement shown in FIG. 4B is an example of tiling of a real image. However, the present disclosure relates to tiling a hologram on a display device. The holograms in accordance with this disclosure comprise a plurality of pixels. A larger hologram can be formed by tiling subsets of pixels of an initial, input, hologram in the same way as is illustrated in FIGS. 4A and 4B. This tiling of holograms is illustrated further in FIGS. 5 and 6.

In some examples, there is provided a holographic projector comprising: a driver or tiling engine arranged to receive one or more input computer-generated holograms comprising [x×y] pixels and map, using at least two different tiling schemes, pixels of the one or more input computer-generated holograms onto pixels of a sequence of output computer-generated holograms comprising [m×n] pixels, where mn>xy, the tiling engine further being arranged to provide the sequence of output computer-generated holograms to a spatial light modulator; a spatial light modulator arranged to receive the sequence of output computer-generated holograms from the tiling engine and represent the sequence of output computer-generated holograms; and a light source arranged to illuminate the sequence of output computer-generated holograms represented on the spatial light modulator to form a corresponding sequence of spatially modulated light patterns. In one example, the tiling engine is arranged to receive one input computer-generated hologram. Alternatively, the one or more input computer-generated hologram may be a sequence of input computer-generated holograms.

The size of the input hologram may be less than the size of the spatial light modulator in both dimensions, and less than the size of the output computer-generated hologram in the at least one dimension. The pixels of each input computer-generated hologram may be mapped to each output computer-generated hologram such that every pixel of the output computer-generated hologram is filled. Optionally, the number of pixels of the output computer-generated hologram is equal to the number of pixels of the spatial light modulator. This ensures that the entire surface area of the spatial light modulator is used.

When mn>xy, each tile is of a smaller size than the total size of the output computer-generated hologram represented on the spatial light modulator. The output computer-generated hologram, which is ultimately represented on the spatial light modulator, thus comprises a plurality of (i.e. two or more) tiles. In some embodiments, the holographic pattern, or output computer-generated hologram, written to the spatial light modulator comprises at least one full-tile (that is, the complete input hologram) and at least one part-tile (that is, a continuous subset of pixels of the hologram). When the output hologram is represented or displayed on the spatial light modulator, the output hologram can therefore be considered as comprising a number of tiles.

The first tiling scheme may comprise mapping a full-tile of an input computer-generated hologram onto a contiguous first subset of [x×y] pixels of the first output computer-generated hologram and the second tiling scheme comprises mapping the full-tile of the input computer-generated hologram onto a contiguous second subset of [x×y] pixels of the second output computer-generated hologram. The first subset and second subset may only partially overlap. That is, the positions of the pixels of the first subset and second subset only partially overlap.

The first tiling scheme may comprise mapping a first plurality of part-tiles of the input computer-generated hologram onto the first output computer-generated hologram. The second tiling scheme may comprise mapping a second plurality of part-tiles of the input computer-generated hologram onto the second output computer-generated hologram. The first plurality of part-tiles and second plurality of part-tiles may be different. For example, the first plurality of part-tiles and second plurality of part-tiles may be different in number. Alternatively, or additionally, at least one part-tile of the first plurality may be different in size to all part-tiles of the second plurality.

In some examples, the tiling scheme maps a full-tile of the received computer-generated hologram, where the full-tile is a contiguous set of the [x×y] pixels of the received computer-generated hologram, onto a contiguous subset of [x×y] pixels of the output computer-generated hologram. The tiling scheme further maps a first part-tile of the received computer-generated hologram, wherein the first part-tile is a contiguous subset of [a×b] pixels of the received computer generated hologram, where a≤x and b<y or a<x and b≤y onto a contiguous subset of [a×b] pixels of the output computer-generated hologram. The tiling scheme further maps a second part-tile of the received computer-generated hologram, where the second part-tile is a contiguous subset of [a'×b'] pixels of the received computer generated hologram, where a'≤x and b'<y or a'<x and b'≤y, onto a contiguous subset of [a'×b'] pixels of the output computer-generated hologram. Finally, the tiling scheme maps a third part-tile of the received computer-generated hologram, where the third part-tile is a contiguous subset of [a"×b"] pixels of the received computer generated hologram, where a"≤x and b"<y or a"<x and b"≤y, onto a contiguous subset of [a"×b" ] pixels of the output computer-generated hologram. The dimensions of these tiles are such that (ab+a' b'+a" b"+xy)=mn.

In one example, a full-tile, a first part-tile, a second part-tile, and a third part-tile are arranged within each output computer generated hologram to fill the spatial light modulator. These four different tiles can be formed and arranged as follows. Firstly, a full-tile is arranged in the output hologram. A width of a first part-tile is equal to a width of the full-tile and a height of the first part-tile fills the remainder of a height of the output computer-generated hologram (i.e. the height of the full-tile and the height of the first part-tile equal the height of the output computer-generated hologram). A height of a third part-tile is equal to a height of the full-tile, and a width of the third part-tile fills the remainder of a width of the output computer-generated hologram (i.e. the width of the third part-tile and the width of the complete tile equal the width of the output computer-generated hologram). A second part-tile fills the remainder of the at least one corresponding output computer generated hologram, left over by the full-tile and the first and third part-tiles. Different tiling schemes can then alternate, for example, between two different arrangements of tiles, three different arrangements of tiles, and so on, or cycle through all possible arrangements of the tiles.

In one instance, the first output computer-generated hologram comprises a combination of two or more tiles selected from: the full-tile, the first part-tile, the second part-tile, and the third part-tile. For example, the first output computer-generated hologram can comprise a full-tile and a first part-tile, or a full-tile, a second part-tile, and a third part-tile, but no first part-tile. In some embodiments, the holographic pattern written to the spatial light modulator comprises at least one full-tile (a complete tile, that is, the complete input hologram) and at least one fraction of a whole tile (a part-tile, that is, a continuous subset of pixels of the input hologram). Alternatively, any other conceivable combination of tiles can be used.

The second output computer-generated hologram may comprise a different combination of tiles than the first output computer-generated hologram because a different tiling scheme is used. As discussed above, using different tiling schemes is advantageous as it results in a higher quality image. This can be achieved by using a different combination of tiles between the two tiling schemes. Alternatively, this can be achieved by using a different number of tiles between the first and second tiling schemes. Alternatively, the same number and combination of tiles can be used in each tiling scheme, and only the location, or arrangement, of the tiles within the output computer-generated hologram is altered. In a preferred embodiment, the first and second tiling schemes both comprise one full-tile and a plurality of part-tiles but the position of the full-tile on the spatial light modulator is different in the two tiling schemes. In both tiling schemes, the space around the full-tile is filled with part-tiles.

Further to the above, the tiles can be arranged such that, for example, a first tiling scheme maps a first part-tile onto a first output computer-generated hologram, and a second tiling scheme maps a first part-tile onto a second computer-generated hologram. The positions of the pixels of the output computer-generated holograms which comprise said first part-tile can either be completely different between the first and second computer-generated output holograms, or the positions of the pixels can partially overlap between the first and second output computer-generated holograms.

In some examples, the tiling scheme can then map a second part-tile onto each computer-generated hologram, where the first part-tile and second part-tile form a continuous group of pixels on each output computer-generated hologram. For example, the two part-tiles can be arranged such that their combined width is equal to the width of the spatial light modulator, or their combined heights are equal to the height of the spatial light modulator. As such, these part-tiles are advantageously arranged as a continuous subset of pixels on the spatial light modulator.

Optionally, the holographic projector further comprises a light source arranged to illuminate the spatial light modulator. Illumination of the spatial light modulator when the output computer-generated hologram is displayed or represented on the spatial light modulator enables the formation of a holographic reconstruction corresponding to the output computer-generated hologram. The light source may be an at least partially spatially coherent light source, a spatially coherent light source, or a laser.

Figure 5:
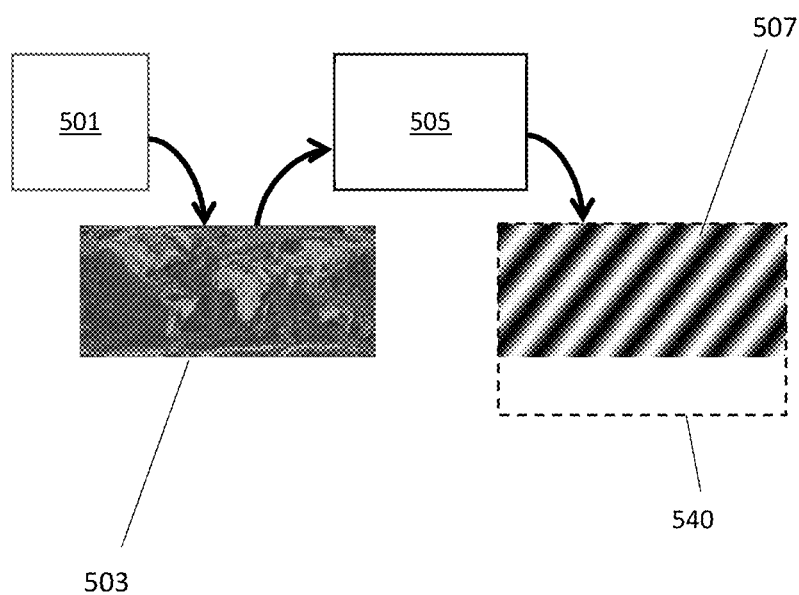
FIG. 5 shows an example of the generation of a hologram.

FIG. 5 illustrates the generation of a hologram. In particular, an HDMI source or other image source 501 provides an image 503 to a hologram engine 505. The hologram engine 505 is arranged to form or otherwise generate a hologram, for example in accordance with the process described above with reference to FIGS. 2A and 2B, or by any other method of forming a hologram known to the skilled person.

The hologram engine 505 outputs a computer-generated hologram 507. This is a hologram representative of the image 503. The hologram 507 can be displayed on an SLM 540, which can be, for example, a spatial light modulator as described above with reference to FIGS. 1 and 3. The SLM 540 can be a liquid crystal on silicon (LCOS) SLM but other SLMs, including optically-addressed SLMs, are equally suitable. The dotted area in FIG. 5 illustrates the full area of the SLM suitable for display or representing a hologram. Notably, not all pixels of the spatial light modulator are used when the hologram 507 is represented on the SLM.

Figure 6:
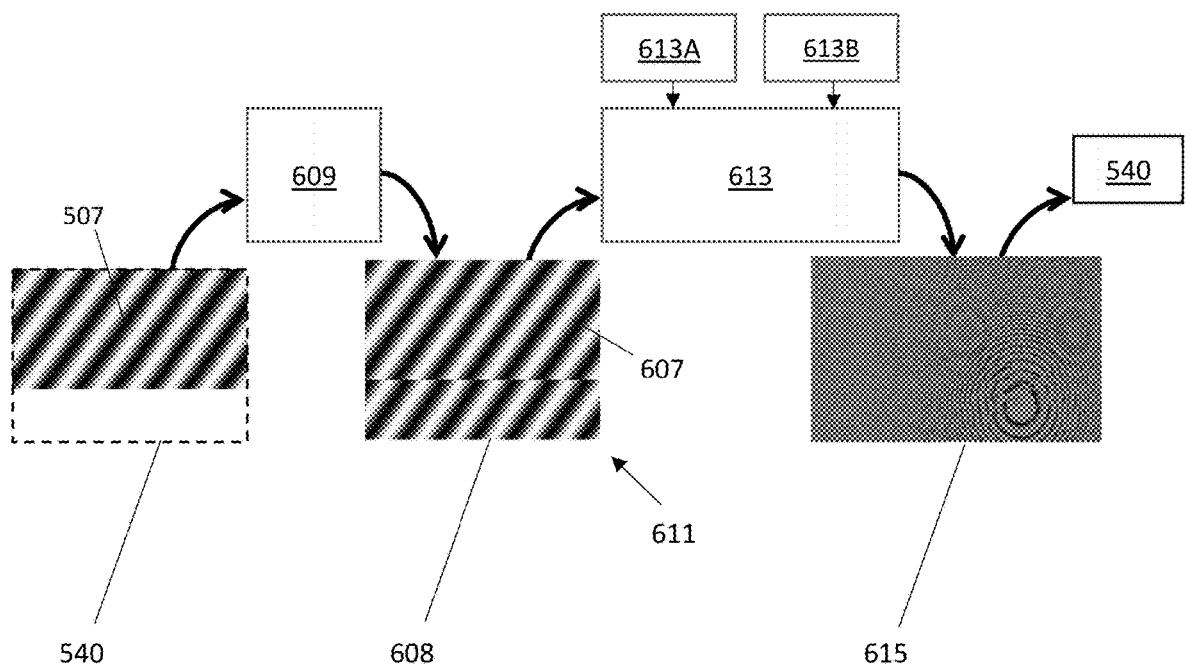
FIG. 6 shows a holographic projector.

Carrying on from FIG. 5, FIG. 6 illustrates the operation of a tiling engine in accordance with the present disclosure. A tiling engine 609 receives the computer-generated hologram 507 generated by the hologram engine 505 as an input, or received, hologram. The tiling engine 609 then forms a corresponding output computer generated hologram 611 for output and subsequent encoding and display by the spatial light modulator 540. The output computer-generated hologram 611 is larger than the original hologram 507 and comprises [m×n] pixels, where m>x and n>y.

The output computer-generated hologram 611 is formed by the tiling engine 609 by mapping pixels of the received input computer-generated hologram 507 in accordance with a tiling scheme. The tiling scheme may also be referred to as an addressing scheme or mapping scheme. The tiling scheme provides instructions as to which pixels of the input hologram 507 should be mapped to which pixels of the output hologram 611. As illustrated in FIG. 6, the output hologram 611 of this example comprises a set 607 of [x×y] pixels which are identical to the [x×y] pixels of the input hologram 507. The output hologram 611 also comprises a subset 608 of [a×b] pixels, which represents a contiguous, continuous subset of the [x×y] pixels of the input hologram 507. A contiguous, continuous subset of pixels [a×b] can be understood as representing a complete sub-part of the hologram 507, as illustrated in FIG. 4B with respect to a real input image. This subset of [a×b] pixels can be considered to be a first part-tile, where the set 607 of [x×y] pixels of the output hologram 611 can be considered to be a full-tile which is identical to the initial hologram 507. In this respect, the tiling scheme maps the pixels of the input hologram 507 to the output hologram 611 in groups of pixels, or tiles, rather than randomly assigning individual adjacent pixels of the input hologram 507 to completely different positions relative to another in the output hologram 611.

Once the tiled output hologram 611 is formed by the tiling engine 609, it can be displayed on a spatial light modulator, for example spatial light modulator 540. Alternatively, additional information can be added to the output hologram 611 before it is encoded by the SLM. In the example device shown in FIG. 6, an additional engine 613 for applying software optics to the hologram is provided. These software optics can be, for example, data representative of a lens 613A and grating data 613B as described above. The software optics are also referred to herein as virtual optics.

The data representative of a lens 613A is data, for example phase-only data, the addition of which to the hologram data has the effect of placing a lens in the beam path and moving the reconstructed image along the beam path in a direction perpendicular to the plane of the SLM (or a focal plane of the optics in the system). The data representative of a lens 613A acts to simulate the presence of a real, physical lens. Computational, or software, lensing data (in other words, a software or computational lens) thus acts to add optical power to the system. In some embodiments, the data representative of a lens 613A is configured to perform a Fourier transform. Additionally, or alternatively, the data representative of a lens 613A can also add optical power to correct for aberrations in the screen or other surface on which a holographic reconstruction will be formed. For example, the optical power of a windscreen can be compensated for by adding data representative of a lens 613A.

As mentioned above, the data representative of a lens 613A, is optionally a Fourier transform lens, which acts to Fourier transform the holographic data into the spatial domain, avoiding the need for a physical lens. It is known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field.

In further embodiments, the hologram may include grating data 613B—that is, data arranged to perform the function of a grating such as beam steering. The data 613B is data, the addition of which to the hologram data has the effect of placing a grating in the beam path and moving the reconstructed image in a direction perpendicular to the beam path and parallel to the plane of the SLM (or a focal plane of the optics). Again, it is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

Once the virtual or software optics have been applied by the virtual optics engine 613, a final hologram 615 can be output for setting the pixels of the spatial light modulator 540 in accordance with the output computer-generated hologram. As discussed previously, the spatial light modulator can be liquid crystal on silicon, or LCOS, spatial light modulator 540. The spatial light modulator 540 is arranged to receive and represent the final hologram 615 and output spatially-modulated light in accordance with the computer-generated hologram represented on the spatial light modulator when illuminated, the spatially modulated light for forming a holographic reconstruction at a replay field location, for example on a screen or vehicle windscreen.

In the example shown in FIGS. 5 and 6, only a single output computer-generated hologram is formed by the tiling engine for a given input hologram 507 of input image 503. However, as will be easily recognised, a sequence of output computer-generated holograms 611 can be generated, or formed, by the tiling engine 609. The sequence of output computer-generated hologram 611 can be implemented in different ways.

In a first implementation, the tiling engine 609 is arranged to receive a first computer-generated hologram 507 comprising [x×y] pixels and form a plurality of output computer-generated holograms comprising [m×n] pixels by mapping pixels of the first computer-generated hologram 507 onto pixels of each of the plurality of output computer-generated holograms 611 in accordance with a corresponding plurality of different tiling schemes. In some embodiments, the first computer-generated hologram 507 received by the tiling engine 609 is one input hologram of a sequence of input holograms and a plurality of output computer-generated holograms 611 correspond to each input hologram. In one particular example of this implementation, the first received computer-generated hologram 507 is mapped to form first and second output computer-generated holograms 611 in accordance with respective first and second tiling schemes. Of course, the first computer-generated hologram received by the tiling engine 609 may be a hologram of a single image, rather than a hologram of a frame of a video to create a holographic reconstruction of the image.

In a second implementation, the tiling engine 609 is arranged to receive a plurality of input computer-generated holograms 507 and form a corresponding plurality of output computer-generated holograms 611 by mapping pixels of the plurality of computer-generated holograms 507 onto pixels of the output computer-generated holograms 611 in accordance with a corresponding plurality of different tiling schemes. In one particular example of this implementation, the tiling engine receives a first computer-generated hologram 507 and forms a first output computer-generated hologram 611 by mapping pixels of the first input computer-generated hologram 507 onto pixels of the first output computer-generated hologram 611 in accordance with a first tiling scheme. The tiling engine 609 then receives a second input computer-generated hologram and forms a second output computer-generated hologram by mapping pixels of the second received computer-generated hologram onto pixels of the second output computer-generated hologram in accordance with a second tiling scheme. The process may be repeated for subsequent input holograms.

In both the above examples, the tiling engine is arranged to use a first tiling scheme to map pixels onto a first output computer-generated hologram and a second tiling scheme to map pixels onto a second output computer-generated hologram. Preferably, the first and second tiling schemes of the above example implementations are different, though it is conceivable that they could also be the same. Where there is a plurality of tiling schemes, the tiling schemes may all be different, or may alternate between two different tiling schemes, or some or all of the tiling schemes may be the same. An example of the use of two different tiling schemes is described below with respect to FIGS. 7A to 7C.

Figure 7A:
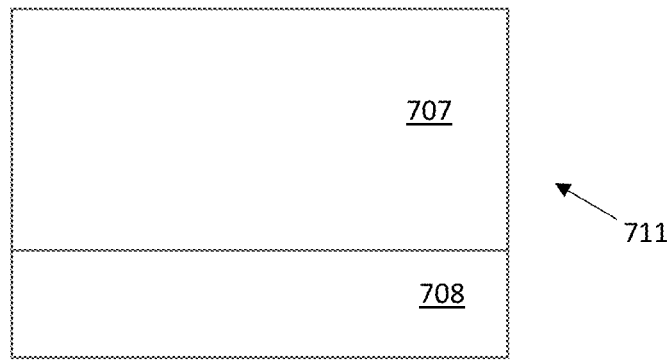
FIGS. 7A to 7C show an example of a sequence of tiling arrangements.

FIG. 7A illustrates an example of an output hologram 711. This can be considered as equivalent to output hologram 611 of FIG. 6. Output hologram 711 comprises two tiles: a first, complete tile 707, which represents a complete copy of the input hologram 507 corresponding to the initial input image (feature 503 of FIG. 5), and a second, part-tile 708, which represents a subset of the pixels of the input hologram 507. The initial input hologram 507 is mapped to the output hologram 711 by the tiling engine 609 using a first tiling scheme.

Figure 7B:
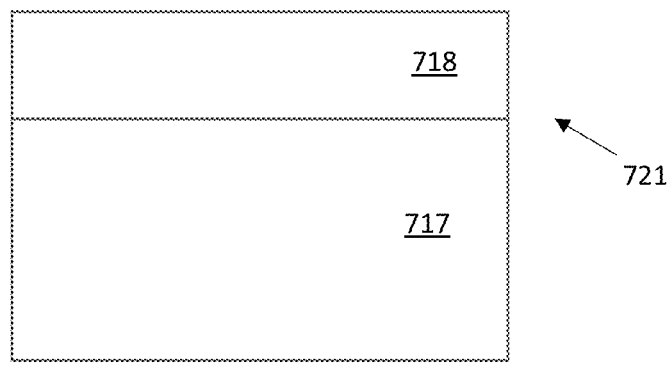

FIG. 7B illustrates a second output hologram 721. Output hologram 721 comprises a first, complete tile 717 and a second, part-tile 718. In one example hologram 721 is an output computer-generated hologram corresponding to the input hologram 507. In another example, hologram 721 is an output computer-generated hologram corresponding to a different, second input hologram, which is received by the tiling engine 609 and mapped to form the output hologram 721 in accordance with the second tiling scheme. As evidenced by comparing FIGS. 7A and 7B, the first and second tiling schemes are different.

Figure 7C:
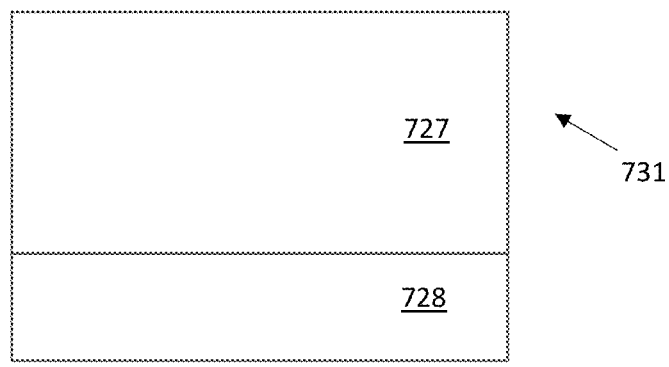

FIG. 7C illustrates a third output hologram 731. Output hologram 731 comprises a first, complete tile 727 and a second, part-tile 728. In one example, hologram 731 is an output computer-generated hologram corresponding to either the input hologram 507 or to the second input hologram used to form the output computer-generated hologram 721 shown in FIG. 7B. In another example, hologram 731 is an output computer-generated hologram corresponding to a third, different, input hologram. The third input hologram is received by the tiling engine 609 and mapped to form the output hologram 731 in accordance with a third tiling scheme. As evidenced by comparing FIGS. 7A and 7C, the first and third tiling schemes are the same. In this example, the holographic projector is configured to alternate between the first and second tiling schemes. This alternation can occur either within a frame or between frames, depending on the specific implementation.

Figure 8A:
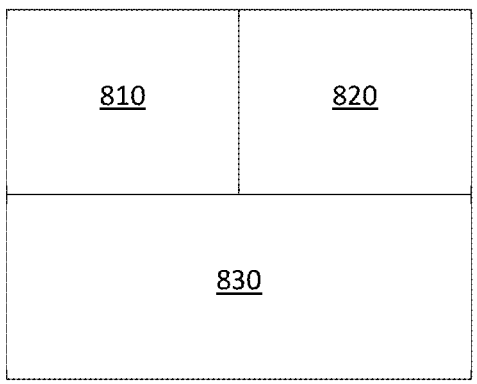
FIGS. 8A to 8D show an alternative sequence of tiling arrangements.
Figure 8B:
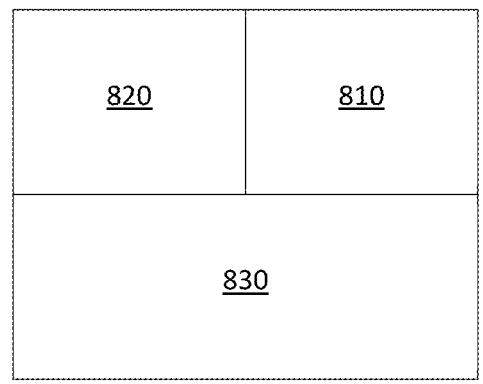
Figure 8C:
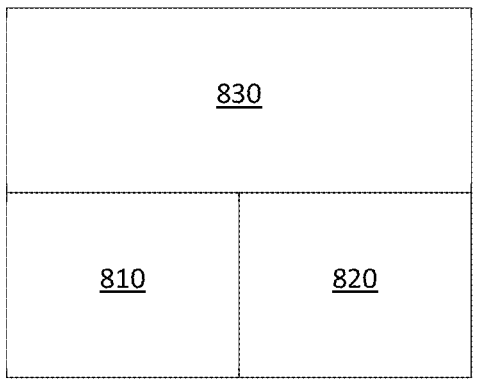
Figure 8D:
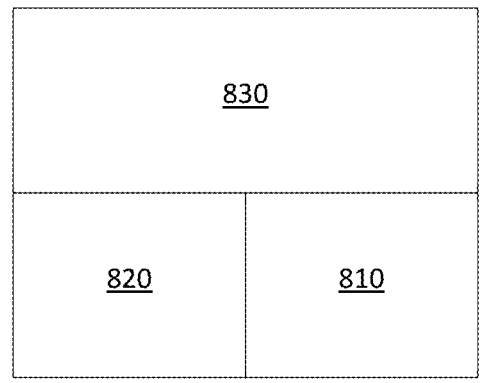

FIGS. 8A to 8D illustrate an alternative implementation of the tiling arrangement achievable with the present holographic projector. Each of FIGS. 8A to 8D illustrate mapping of an input, or received, computer-generated hologram to an output computer-generated hologram in accordance with a different tiling scheme. Each tiling scheme maps the initial input hologram as one complete tile 830, a first part-tile 810 and a second part-tile 820. FIG. 8A shows the first tiling scheme, which maps the first and second part-tiles 810 and 820 next to each other and above the complete tile 830. FIG. 8B shows the second tiling scheme, in which the location of the first and second part-tiles is swapped. The complete tile 830 remains in the same position. FIG. 8C shows the third tiling scheme, in which the positions of the first and second part-tiles are swapped back again, and the position of the complete tile and the part-tiles is also swapped. The complete tile 830 is now above the two part-tiles in FIG. 8C, whereas with the second tiling scheme in FIG. 8B, the complete tile 830 was below the part-tiles. FIG. 8D shows the fourth tiling scheme, in which the complete tile 830 remains in the same location as with the third tiling scheme of FIG. 8C, but the locations of the first and second part-tiles 810 and 820 are again swapped.

Figure 9:
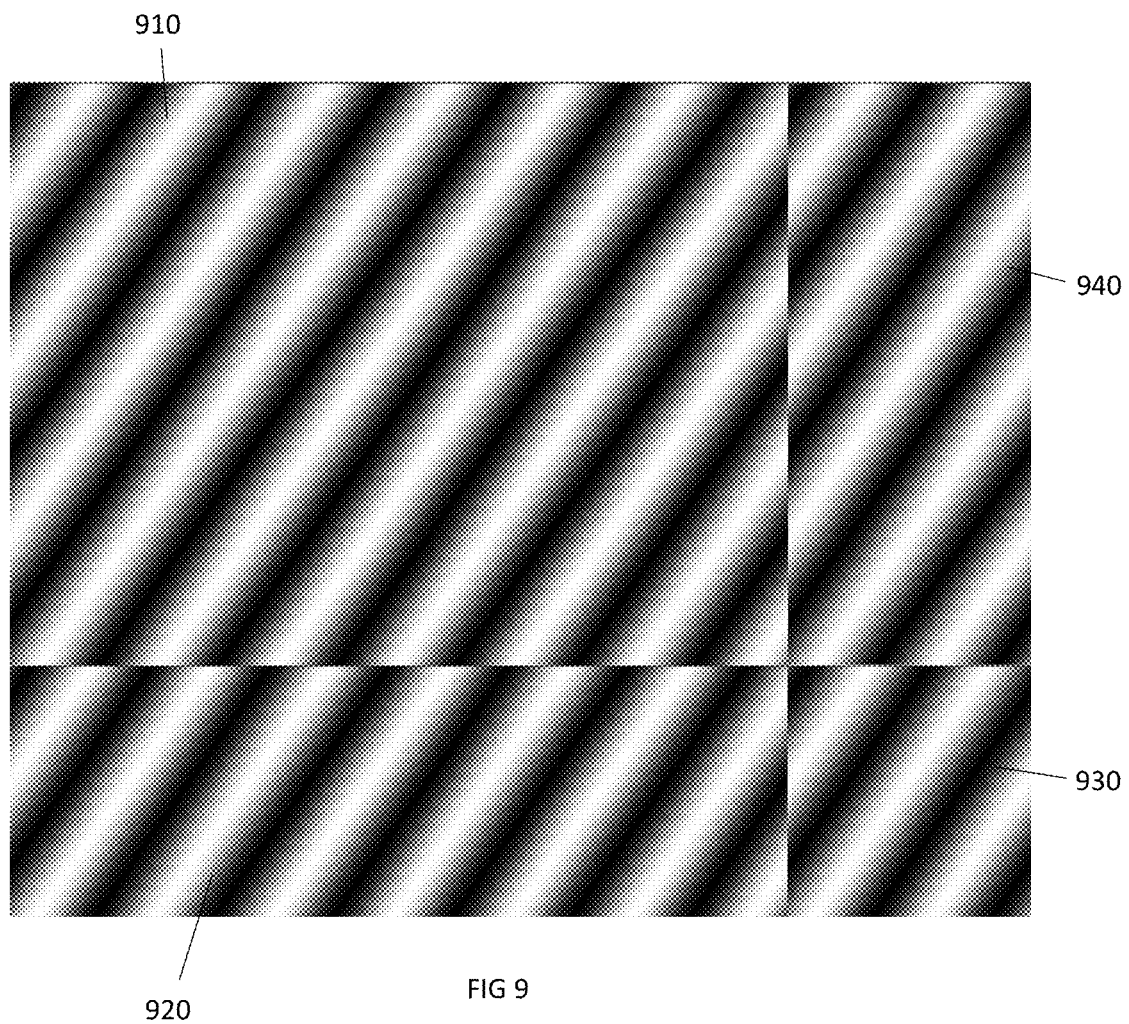
FIG. 9 shows a tiling arrangement.
Figure 10A:
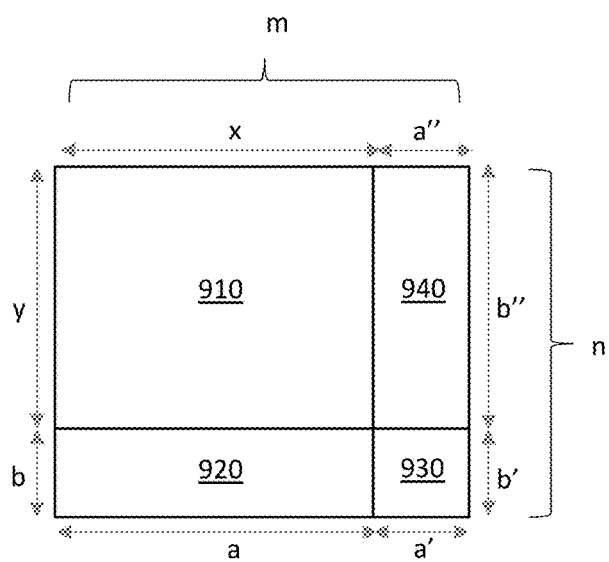
FIGS. 10A to 10F show an example sequential arrangement of the tiling arrangement shown in FIG. 9.
Figure 10B:
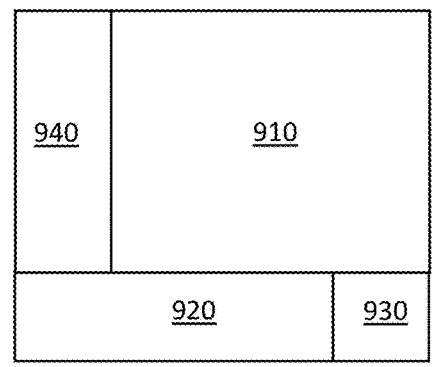
Figure 10C:
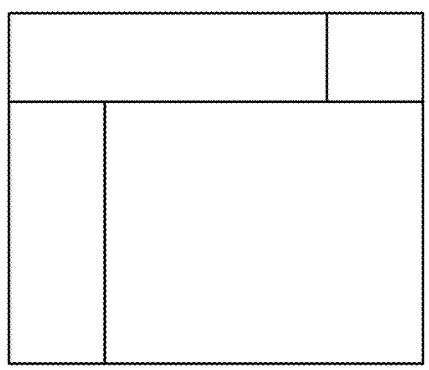
Figure 10D:
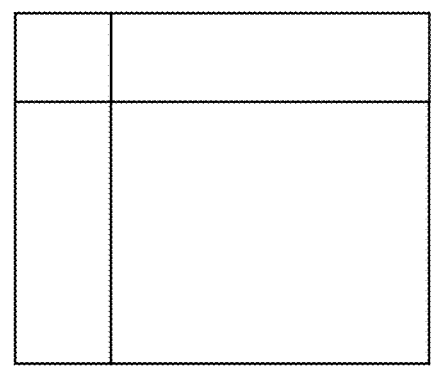
Figure 10E:
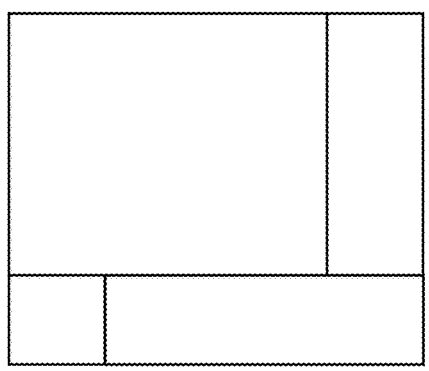
Figure 10F:
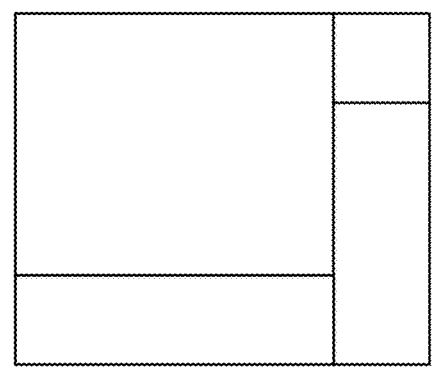

FIG. 9 shows an alternative implementation of the tiling arrangement of the holographic projector. In FIG. 9, the output computer-generated hologram comprises four tiles: a complete tile 910, a first part-tile 920, a second part-tile 930 and a third part-tile 940. These four tiles fill the entire available output of the spatial light modulator. The dimensions of these tiles are illustrated in FIG. 10A. It can be seen that a width of the first part-tile is equal to a width of the complete tile, a height of the third part-tile is equal to a height of the complete tile, and wherein the second part-tile fills the remainder of the at least one corresponding output computer generated hologram. The example tiling shown in FIG. 9 is continuous. That is, adjacent tiles connect end to end in one or both directions.

As shown in FIG. 10A, the complete tile 910 is the contiguous, continuous set of the [x×y] pixels of the received computer-generated hologram (for example input computer generated hologram 507, as illustrated in FIG. 6) mapped onto a contiguous set of [x×y] pixels of the output computer-generated hologram. For the complete tile 910, the number of pixels x is representative of the width, and the number of pixels y is representative of the height. The first part-tile 920 is a contiguous, continuous subset of [a×b] pixels of the received computer generated hologram, where a=x and b<y, mapped onto a contiguous subset of [a×b] pixels of the output computer-generated hologram. For the first part-tile 920, the number of pixels a is representative of the width, and the number of pixels b is representative of the height. As discussed with reference to FIG. 9, the complete tile 910 has a width equal to that of the first part-tile 920. The second part-tile 930 is a contiguous subset of [a'×b'] pixels of the received computer generated hologram, where a'<x and b'<y, mapped onto a contiguous subset of [a'×b'] pixels of the output computer-generated hologram. For the second part-tile 930, the number of pixels a' is representative of the width, and the number of pixels b' is representative of the height. Lastly, the third part-tile 940 is a contiguous subset of [a"×b" ] pixels of the received computer generated hologram, where a"<x and b"=y, mapped onto a contiguous subset of [a"×b" ] pixels of the output computer-generated hologram. For the third part-tile 940, the number of pixels a" is representative of the width, and the number of pixels b" is representative of the height. As discussed with reference to FIG. 9, the third part-tile 940 has a height equal to the height of the complete tile 910.

In FIG. 10A, the mapping of the four different tiles onto the output computer-generated hologram occurs in accordance with a first tiling scheme. The second part-tile 930 has a width and a height such that it fills the remainder of the output computer generated hologram. In other words, the tiles are arranged such that a'+x=a"+a=m and b+y=b"+b'=n, thereby all available space in the output computer-generated hologram is filled. Each of the FIGS. 10B to 10F illustrate a different configuration of the four tiles, which represents mapping of the initial input hologram to the output computer-generated hologram in accordance with different tiling schemes. As can be seen from FIGS. 10A to 10F, the number of tiles in the output computer-generated hologram does not vary, only their arrangement does.

Figure 11A:
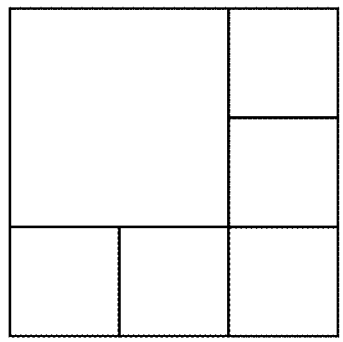
FIGS. 11A to 11F show an alternative tiling arrangement.
Figure 11B:
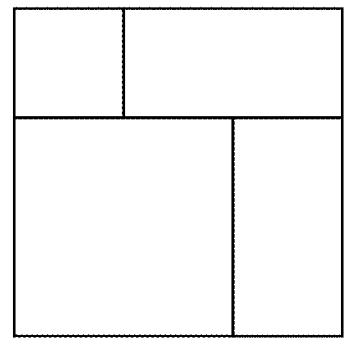
Figure 11C:
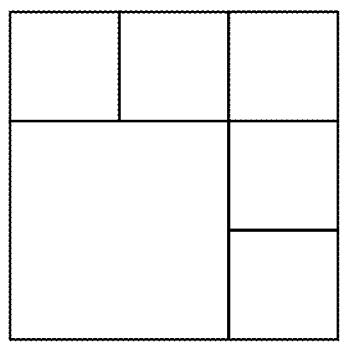
Figure 11D:
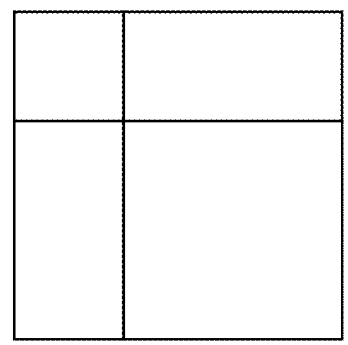
Figure 11E:
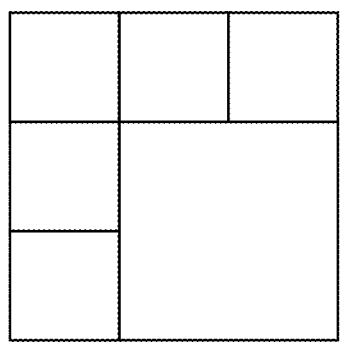
Figure 11F:
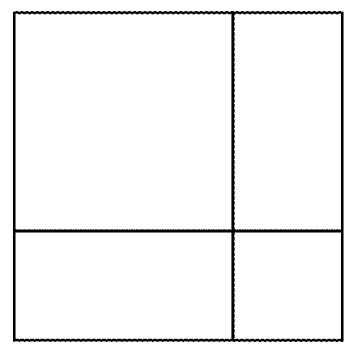

In contrast, FIGS. 11A to 11F illustrate a variation in the number of tiles between different tiling schemes, and thus a variation in both the size of the tiles and their location within the output computer-generated hologram. In particular, FIG. 11 A shows a mapping of an input hologram to six tiles, one complete tile and five part-tiles, each part-tile being equal in size. FIG. 11B then shows a mapping of one complete tile, a first part-tile, and two second part-tiles different to the first part-tile. FIGS. 11C to 11F then show an alternation in the number of tiles mapped between that of FIG. 11A and that of FIG. 11B, although the locations of said tiles within the output computer-generated hologram varies between Figures, indicating each mapping occurs in accordance with a different tiling scheme.

The arrangements shown in FIGS. 7A to 7C, 8A to 8D, 10A to 10F and 11A to 11F all demonstrate different methods of tiling. By varying the number, size and/or locations of tiles mapped between consecutive tiling schemes, the quality of the holographic reconstruction is improved. The rate of change of tiling schemes may be greater than 50 Hz, optionally, 50-500 Hz.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A driver for a spatial light modulator comprising [m×n] pixels, wherein the driver is arranged to receive input holograms each comprising [x×y] pixels, wherein m≥x and n≥y, and drive the spatial light modulator to display thereon output holograms each comprising [m×n] pixels by tiling each input hologram onto the pixels of the spatial light modulator to form an output hologram corresponding to each input hologram using a tiling scheme, wherein
the driver is arranged to use a first tiling scheme to display a first output hologram and a second tiling scheme to display a second output hologram, wherein each output hologram comprises a plurality of tiles of the input hologram and each tiling scheme defines a size of each tile and a position of each tile on the pixels of the spatial light modulator.

2. A driver as claimed in claim 1 wherein adjacent tiles of each output hologram connect one end of the input hologram to an opposite of the input hologram.

3. A driver as claimed in claim 1 wherein each output hologram comprises at least one full-tile, wherein a full-tile is a complete, contiguous group of [x×y] pixels of the input hologram.

4. A driver as claimed in claim 1 wherein m≥2x and n≥2y.

5. A driver as claimed in claim 1 wherein each output hologram comprises a plurality of part-tiles, wherein a part-tile is a contiguous subset of pixels of the input hologram.

6. A driver as claimed in claim 1 wherein the driver is arranged to: receive a first input hologram; tile the first input hologram onto the pixels of the spatial light modulator, at a first time, using a first tiling scheme to display a first output hologram; and tile the first input hologram onto the pixels of the spatial light modulator, at a second time, using a second tiling scheme to display a second output hologram.

7. A driver as claimed in claim 1 wherein the driver is arranged to receive a video-rate sequence of input holograms and, for each input hologram, display a plurality of corresponding output holograms in succession, before the next input hologram is received, by tiling the input hologram onto the pixels of the spatial light modulator using a plurality of different tiling schemes.

8. A driver as claimed in claim 1 wherein the driver is arranged to: receive a first input hologram; tile the first input hologram onto the pixels of the spatial light modulator, at a first time, using a first tiling scheme to display a first output hologram; receive a second input hologram; and tile the second input hologram onto the pixels of the spatial light modulator, at a second time, using a second tiling scheme to display a second output hologram.

9. A driver as claimed in claim 1 wherein the driver is arranged to receive a video-rate sequence of input holograms and display a corresponding video-rate sequence of output holograms by successively tiling each input hologram onto the pixels of the spatial light modulator and successively changing the tiling scheme.

10. A driver as claimed in claim 1 wherein each input hologram comprises a spatial distribution of spatial frequencies, optionally, wherein each input hologram is a Fourier or Fresnel hologram.

11. A holographic projector comprising the driver as claimed in claim 1 and further comprising the spatial light modulator and a light source arranged to illuminate each output hologram with coherent light such that a holographic reconstruction corresponding to each input hologram is formed on a replay plane.

12. A method of driving a spatial light modulator comprising [m×n] pixels, the method comprising:
receiving input holograms comprising [x×y] pixels, wherein m≥x and n≥y;
displaying a first output hologram comprising [m×n] pixels by tiling an input hologram onto the pixels of the spatial light modulator, at a first time, using a first tiling scheme;
displaying a second output hologram comprising [m×n] pixels by tiling an input hologram onto the pixels of the spatial light modulator, at a second time, using a second tiling scheme, wherein each output hologram comprises a plurality of tiles of the corresponding input hologram and the tiling scheme defines a size of each tile and a position of each tile on the pixels of the spatial light modulator.

13. A method of driving a spatial light modulator as claimed in claim 12 further comprising:
receiving a first input hologram;
tiling the first input hologram onto the pixels of the spatial light modulator, at the first time, using a first tiling scheme to display a first output hologram; and
tiling the first input hologram onto the pixels of the spatial light modulator, at the second time, using a second tiling scheme to display a second output hologram.

14. A method of driving a spatial light modulator as claimed as claim 12 further comprising:
receiving a video-rate sequence of input holograms;
for each input hologram, displaying a plurality of corresponding output holograms in succession, before the next input hologram is received, by tiling the input hologram onto the pixels of the spatial light modulator using a plurality of different tiling schemes.

15. A method of driving a spatial light modulator as claimed as claim 12 further comprising:
receiving a first input hologram;
tiling the first input hologram onto the pixels of the spatial light modulator, at a first time, using a first tiling scheme to display a first output hologram;
receiving a second input hologram;
tiling the second input hologram onto the pixels of the spatial light modulator, at a second time, using a second tiling scheme to display a second output hologram.

16. A method of holographic projection comprising:
driving a spatial light modulator as claimed in claim 12; and
illuminating each output hologram with coherent light to form at least one holographic reconstruction on a replay plane corresponding to each input hologram.

17. A method of holographic projection as claimed in claim 12 wherein m≥2x and n≥2y.

* * * * *